United States Patent
Matsuzawa (10) Patent No.: US 12,327,054 B2
(45) Date of Patent: Jun. 10, 2025

(54) PRINTING SYSTEM, PRINTING CONTROL DEVICE, AND PRINTING CONTROL PROGRAM

(71) Applicant: SEIKO EPSON CORPORATION, Tokyo (JP)

(72) Inventor: Tomoki Matsuzawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 28 days.

(21) Appl. No.: 18/414,504

(22) Filed: Jan. 17, 2024

(65) Prior Publication Data
US 2024/0248656 A1    Jul. 25, 2024

(30) Foreign Application Priority Data
Jan. 19, 2023    (JP) .................. 2023-006395

(51) Int. Cl.
*G06F 3/12*    (2006.01)

(52) U.S. Cl.
CPC .......... *G06F 3/1228* (2013.01); *G06F 3/1206* (2013.01); *G06F 3/1253* (2013.01); *G06F 3/1288* (2013.01)

(58) Field of Classification Search
CPC .... G06F 3/1228; G06F 3/1206; G06F 3/1253; G06F 3/1288
USPC ........................................... 358/1.15
See application file for complete search history.

(56) References Cited

U.S. PATENT DOCUMENTS

| | | | | |
|---|---|---|---|---|
| 7,724,384 | B2* | 5/2010 | Hwang | G06F 3/1219 |
| | | | | 715/810 |
| 12,039,208 | B2* | 7/2024 | Sugai | G06F 3/1288 |
| 2011/0075205 | A1* | 3/2011 | Oomura | G06F 3/1274 |
| | | | | 358/1.15 |
| 2021/0334054 | A1 | 10/2021 | Matsuzawa | |
| 2023/0161523 | A1* | 5/2023 | Hirouchi | G06F 3/1225 |
| | | | | 358/1.15 |
| 2023/0333792 | A1* | 10/2023 | Shimada | G06F 3/1205 |

FOREIGN PATENT DOCUMENTS

JP    2021-174179 A    11/2021

* cited by examiner

*Primary Examiner* — Allen H Nguyen
(74) *Attorney, Agent, or Firm* — Global IP Counselors, LLP (57) ABSTRACT

A printing control device includes: an acquisition unit configured to acquire printing data including a printer as a print destination, a print setting, and a print image; a specifying unit configured to specify a custom setting configured to be capable of setting in the printer in addition to the print setting; a download unit configured to download a processing module used for the specified custom setting; and an accepting unit configured to accept a setting content of the custom setting from a user.

8 Claims, 7 Drawing Sheets

| PRINTER NAME | FIRMWARE VERSION |
|---|---|
| PRINTER 001 | 1. 0 |

PRINTING SYSTEM, PRINTING CONTROL DEVICE, AND PRINTING CONTROL PROGRAM

The present application is based on, and claims priority from JP Application Serial Number 2023-006395, filed Jan. 19, 2023, the disclosure of which is hereby incorporated by reference herein in its entirety.

BACKGROUND

1. Technical Field

The present disclosure relates to a printing system, a printing control device, and a printing control program.

2. Related Art

In the related art, there has been a technique for enabling a specific function of a printer if the printer has the specific function that cannot be set on a print setting screen displayed by a printing function of an operating system (for example, JP-A-2021-174179).

JP-A-2021-174179 is an example of the related art.

In the related art, in order to execute the specific function, it is necessary to store a program for executing the specific function in a computer. However, some users do not want to store all programs corresponding to the specific functions in a computer in order to execute all the specific functions.

SUMMARY

In order to solve the above problems, a printing system according to one aspect of the disclosure includes: a first computer configured to generate printing data without using a printer-specific printer driver; a second computer configured to generate printer data from the printing data; and a printer configured to perform printing based on the printer data. The second computer includes a receiving unit configured to receive the printing data, a download unit configured to specify a custom setting configured to be capable of setting in the printer in addition to a print setting of the printing data, and download a processing module used for the specified custom setting, an accepting unit configured to accept a setting content of the custom setting from a user via a custom setting screen, a generating unit configured to generate the printer data using the processing module in accordance with the accepted setting content and the printing data, and a transmitting unit configured to transmit the printer data to the printer.

In order to solve the above problems, a printing control device according to one aspect of the disclosure includes: an acquisition unit configured to acquire printing data including a printer as a print destination, a print setting, and a print image; a specifying unit configured to specify a custom setting configured to be capable of setting in the printer in addition to the print setting; a download unit configured to download a processing module used for the specified custom setting; an accepting unit configured to accept a setting content of the custom setting from a user; a generating unit configured to generate printer data using the processing module in accordance with the accepted setting content and the printing data; and a transmitting unit configured to transmit the printer data to the printer.

In order to solve the above problems, a printing control program causing a computer to operate as: an acquisition unit configured to acquire printing data including a printer as a print destination, a print setting, and a print image; a specifying unit configured to specify a custom setting configured to be capable of setting in the printer in addition to the print setting; a download unit configured to download a processing module used for the specified custom setting; an accepting unit configured to accept a setting content of the custom setting from a user; a generating unit configured to generate printer data using the processing module in accordance with the accepted setting content and the printing data; and a transmitting unit configured to transmit the printer data to the printer.

DESCRIPTION OF EMBODIMENTS

Here, an embodiment according to the present disclosure will be described in accordance with the following order.
(1) Configuration of Printing System:
(1-1) Configuration of Printer:
(1-2) Configuration of Server:
(1-3) Configuration of Computer:
(2) Printing Control Process:
(3) Other Embodiments:

(1) Configuration of Printing System

Figure 1:
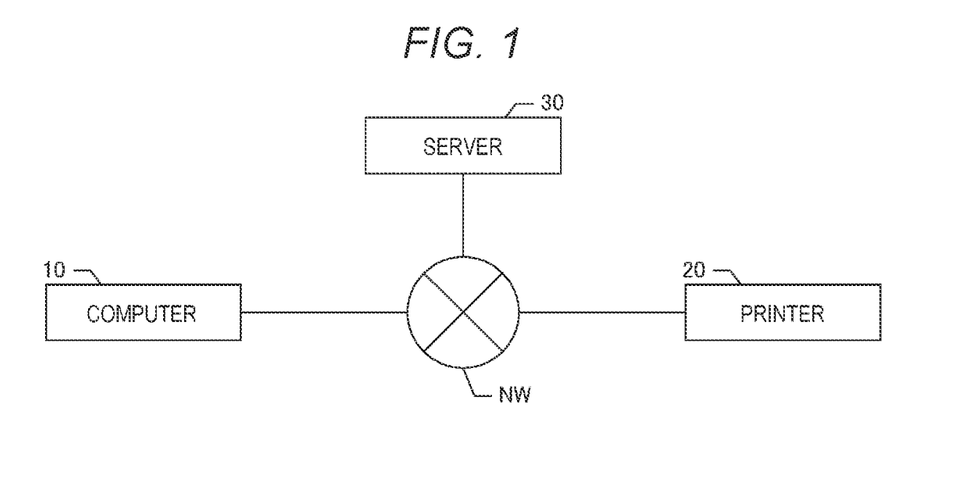
FIG. 1 is a block diagram of a printing system.

FIG. 1 is a diagram showing an example of a printing system including a printing control device according to an embodiment of the present disclosure. In the embodiment, the printing system is implemented by a computer 10. In the embodiment, the computer 10 cooperates with a printer 20 and a server 30. The computer 10 is connected to the printer 20 and the server 30 via a network NW. The computer 10 can communicate with the printer 20 and the server 30 to transmit and receive various kinds of information. An aspect of the network NW is not limited, and the network NW may be the Internet, a local area network (LAN), or both.

In the embodiment, a user can operate the computer 10 to prepare a content to be printed, and can cause the printer 20 to print the content. A printer driver is used for printing by the printer 20. That is, when a user instructs printing of the content using an application program, data indicating the content is transferred to the printer driver. The computer 10 generates printing data for printing the content according to settings designated by the user by a function of the printer driver.

The printer driver includes a printer-specific printer driver prepared by a printer manufacturer, and a general-purpose printer driver included in an operating system (OS) that causes the computer 10 to operate.

When the printer-specific printer driver is used in the embodiment, all functions executable by the printer can be used. On the other hand, the general-purpose printer driver is a part of an OS module, and when the OS is installed in the computer 10, the general-purpose printer driver is also installed. When the general-purpose printer driver is used, it is possible to generate printing data printable by a plurality of models of printers provided by a plurality of manufacturers. As a result, when the general-purpose printer driver is used, printing can be performed by various printers without installing the printer-specific printer driver.

In the embodiment, it is assumed that the printer-specific printer driver is not installed in the computer 10, and the OS includes the general-purpose printer driver. In such the computer 10, printing can be performed by various printers by using the general-purpose printer driver. However, since the general-purpose printer driver supports only functions that can be used in common by a plurality of printers, specific functions in a specific printer may be unusable. Therefore, in the embodiment, the computer 10 is configured such that a processing module capable of executing a function that is executable by the printer 20 but cannot be used when the general-purpose printer driver is used can be added for each function.

Hereinafter, each device constituting the above-described printing system will be described.

(1-1) Configuration of Printer

Figure 2:
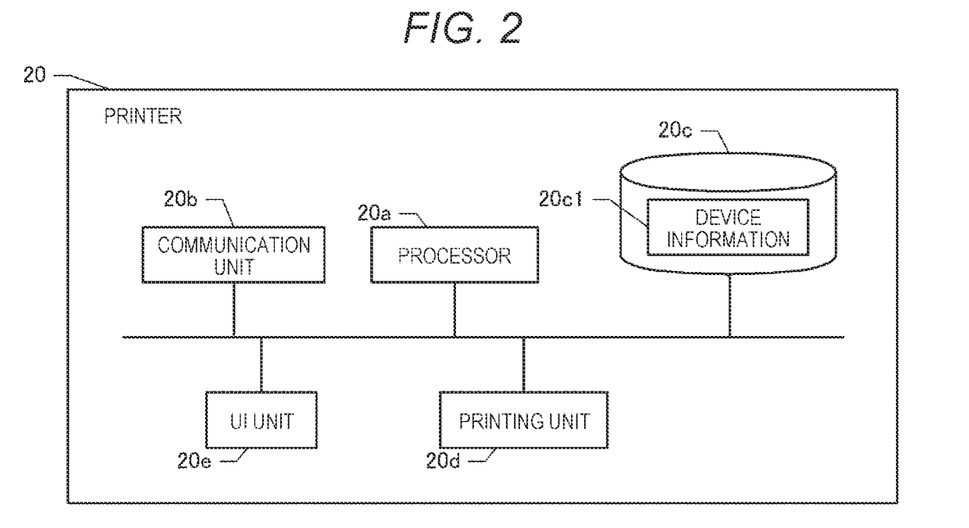
FIG. 2 is a block diagram of a printer.

FIG. 2 is a block diagram showing the configuration of the printer 20. The printer 20 includes a processor 20a, a communication unit 20b, nonvolatile memory 20c, a printing unit 20d, and a UI unit 20e. The processor 20a includes a CPU, a ROM, a RAM, and the like (not shown), and can control the units of the printer 20 by executing various programs recorded in the nonvolatile memory 20c.

The processor 20a may be implemented by a single chip, may be implemented by a plurality of chips, or may be implemented as an SoC together with various functional blocks. For example, an ASIC may be employed instead of the CPU, or the CPU and the ASIC may cooperate with each other. When each device in the embodiment includes a processor, the processor can be implemented in various manners similar to the processor 20a.

The communication unit 20b includes a communication interface for communicating with an external device according to various communication protocols. The printer 20 can communicate with other devices via the communication unit 20b. The communication unit 20b may include an interface for communicating with various removable memories mounted on the printer 20.

The printing unit 20d is a unit that executes printing, and prints a content on a print medium. The printing method thereof is not limited, and can employ various methods such as an inkjet, toner, and sublimation. The print medium is not limited to printing paper, and may be various print media such as cloth, pottery, and resin. The printing unit 20d includes an actuator and various devices for performing printing on various media, a sensor, a drive circuit, and mechanical components. The printing unit 20d may implement various functions related to printing. For example, when the printing unit 20d can implement a finisher function, the printing unit 20d includes a mechanism capable of executing finishing after printing. Finishing is a function of bundling printed matter with a staple, forming a binding hole in the printed matter, or binding the printed matter.

The UI unit 20e includes at least one of a touch panel display, various keys, a switch, an LED, and the like. The touch panel display includes a display panel that displays various kinds of information such as a status of the printer 20 and a remaining amount of ink, and a touch detection panel superimposed on the display panel, and detects a touch operation. The LED performs a lighting display or a blinking display indicating the status of the printer 20, or the like. The processor 20a can acquire an operation content of an administrator via the UI unit 20e.

Figure 3:
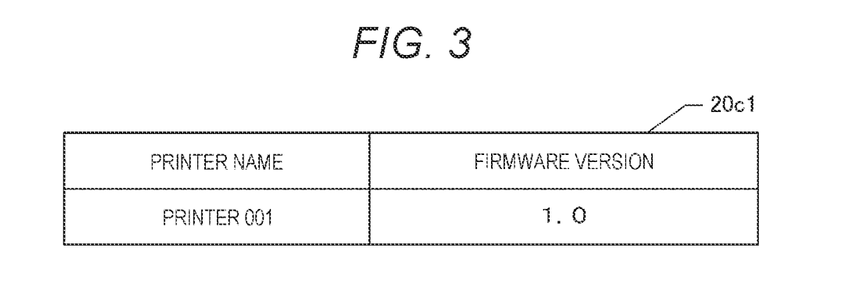
FIG. 3 is a diagram showing device information.

Various kinds of data are stored in the nonvolatile memory 20c. For example, printing data and printer data (described later) transmitted from the computer 10 can be temporarily stored. Further, in the embodiment, device information 20c1 is stored in the nonvolatile memory 20c. The device information 20c1 is information indicating the printer 20, and is referred to for specifying a processing module to be installed. FIG. 3 is an example of the device information 20c1. The example shown in FIG. 3 shows an example in which a printer name, which is identification information of the printer 20, and a firmware version applied to the printer 20 constitute the device information 20c1. The device information 20c1 may indicate a parameter that can change the processing module to be installed, and may include other parameters, for example, a protocol used when the printer 20 performs printing.

In the embodiment, the printer 20 can perform printing based on the printing data or the printer data (described later) transmitted from the computer 10. That is, the processor 20a acquires the printing data or the printer data from the computer 10 via the communication unit 20b, and applies print settings indicated by these pieces of data to control the printing unit 20d, thereby performing printing.

(1-2) Configuration of Server

Figure 4:
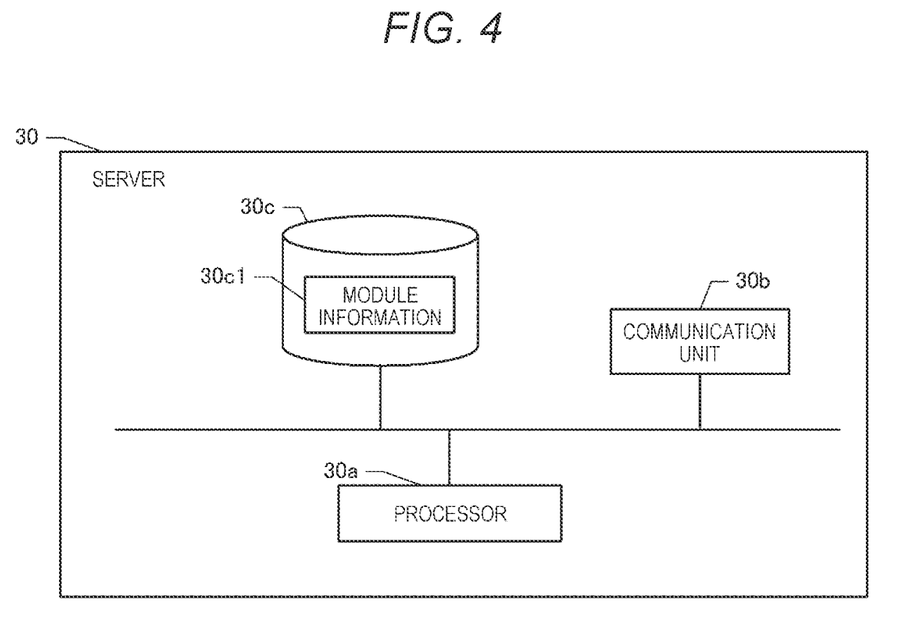
FIG. 4 is a block diagram of a server.

FIG. 4 is a block diagram showing the configuration of the server 30. The server 30 includes a processor 30a, a communication unit 30b, and a nonvolatile memory 30c. The processor 30a includes a CPU, a ROM, a RAM, and the like (not shown), and can control the units of the server 30 by executing various programs recorded in the nonvolatile memory 30c.

The communication unit 30b includes a communication interface for communicating with an external device according to various communication protocols. The server 30 can communicate with other devices via the communication unit 30b. The communication unit 30b may include an interface for communicating with various removable memories mounted on the server 30.

Various kinds of information are stored in the nonvolatile memory 30c of the server 30. In the embodiment, the information to be stored includes module information 30c1. The module information 30c1 is information indicating a processing module that is a program module used when generating data for performing printing applied with various setting contents. In the embodiment, a processing module is prepared for each function executable by the printer. The processing module may be at least a module for using a function that cannot be used when the general-purpose printer driver is used, but may include a processing module of a function that can be used by the general-purpose printer driver.

Figure 5:
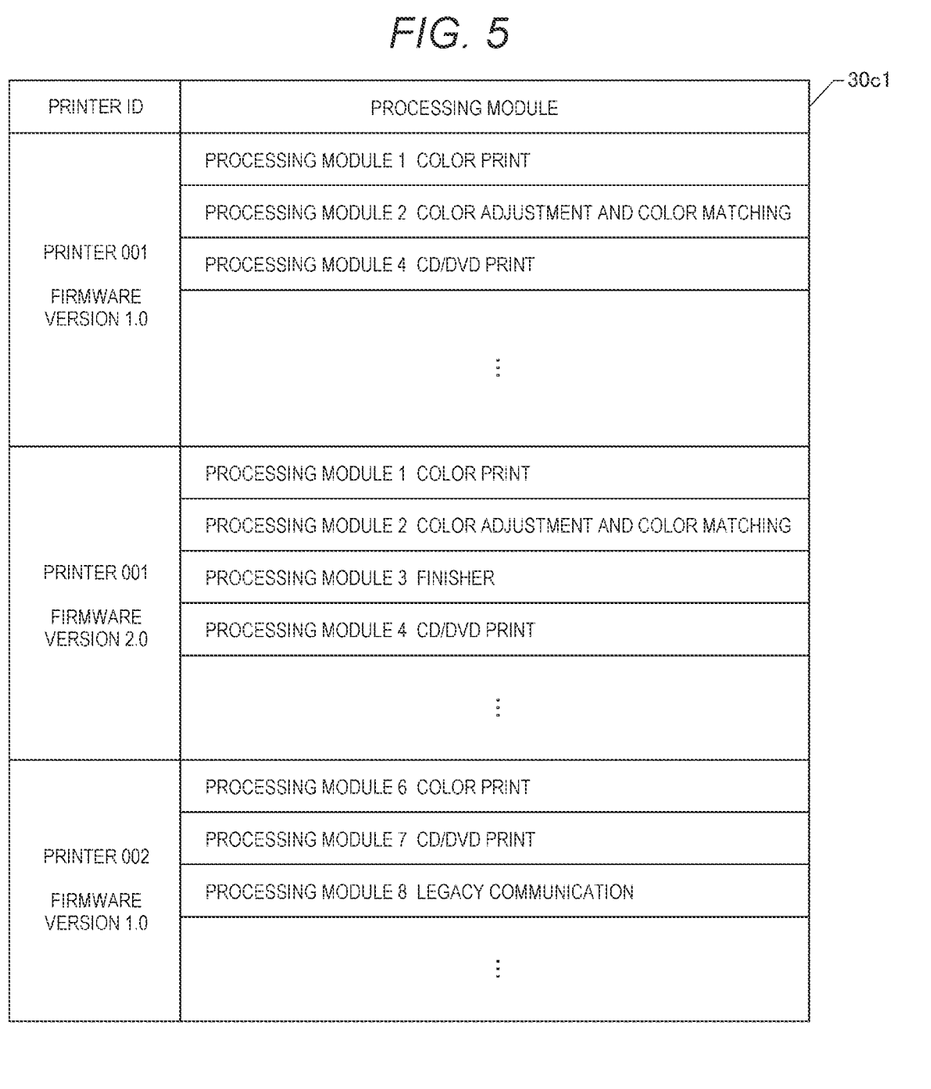
FIG. 5 is a diagram showing module information.

Since the processing module may be different for each printer model, the module information 30c1 is defined for each printer model in the embodiment. Since the processing module may be different for each firmware version applied to the printer, the module information 30*c*1 is defined for each firmware version in the embodiment. FIG. 5 is a diagram showing an example of the module information 30*c*1. As shown in FIG. 5, the module information 30*c*1 is configured by associating the processing module with a combination of a printer name indicating a printer model and a firmware version.

For example, processing modules 1, 2, 4, and the like are associated with a combination of a name of printer 001 and a version of firmware version 1.0. The processing modules 1, 2, 3, 4, and the like are associated with a combination of the name of printer 001 and a version of firmware version 2.0. These processing modules are programs that are transmitted to the computer 10 and installed in the computer 10, and program data is included in the module information 30*c*1. Of course, the data of the program may not be stored redundantly for processing modules that overlap under a plurality of conditions, for example, the processing module 1 shown in FIG. 5.

The processor 30*a* can accept a transmission request of a processing module from the computer 10. The transmission request includes the printer name and the firmware version, and the processor 30*a* replies a list of processing modules associated with these pieces of information. The computer 10 specifies a processing module to be downloaded based on the list of the processing modules, and transmits a download request of the specified processing module. The processor 30*a* refers to the module information 30*c*1, acquires a program of the processing module specified by the download request, and replies the program to the computer 10. The computer 10 installs the replied processing module.

(1-3) Configuration of Computer

Figure 6:
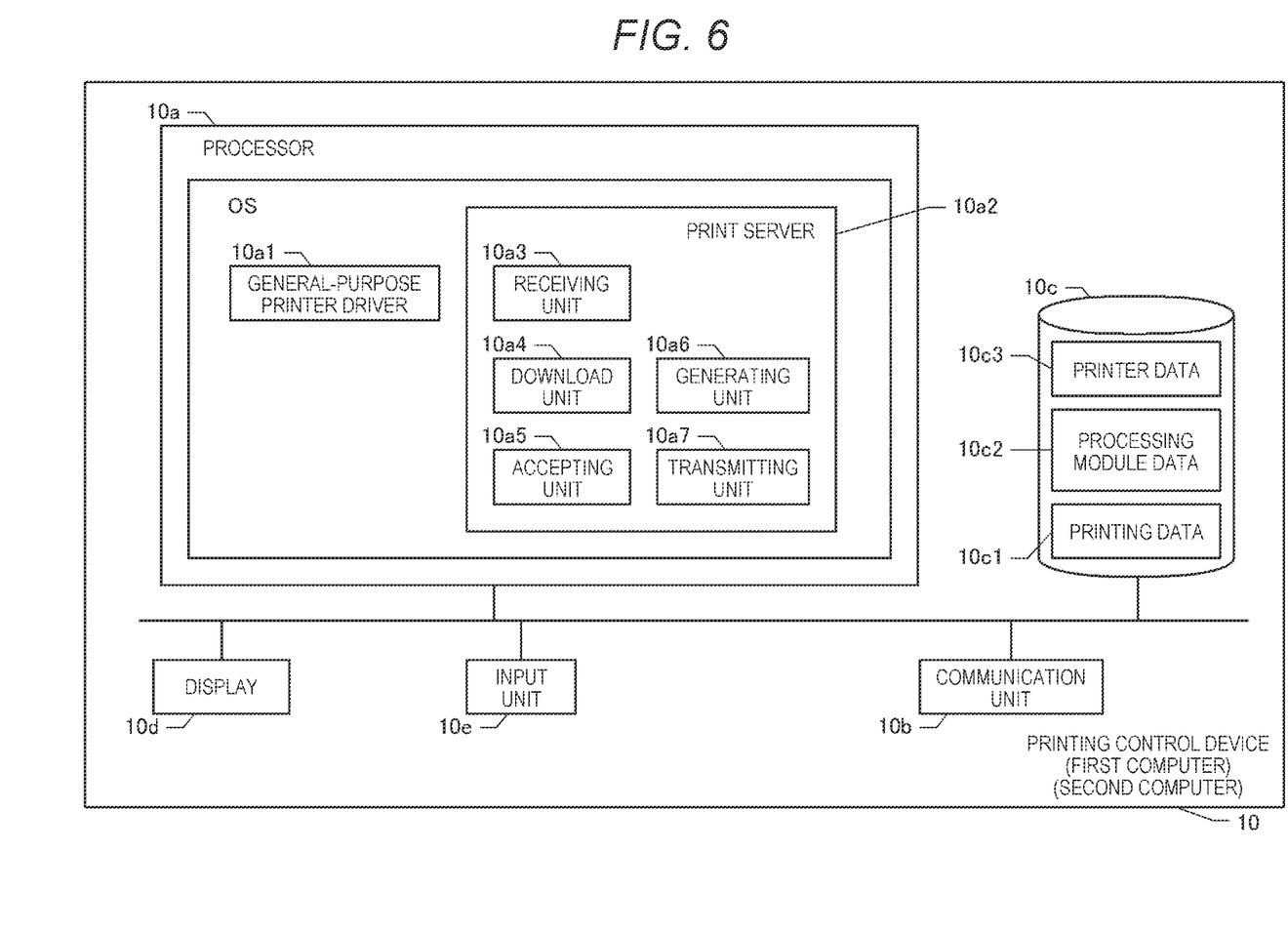
FIG. 6 is a block diagram of a computer as a printing control device.

FIG. 6 is a block diagram showing the configuration of the computer 10. The computer 10 includes a processor 10*a*, a communication unit 10*b*, a nonvolatile memory 10*c*, a display 10*d*, and an input unit 10*e*. The processor 10*a* includes a CPU, a ROM, a RAM, and the like (not shown), and can execute various programs stored in the nonvolatile memory 10*c* to control each unit of the computer 10.

The communication unit 10*b* includes a communication interface for communicating with an external device according to various communication protocols. The computer 10 can communicate with other devices via the communication unit 10*b*. The communication unit 10*b* includes an interface for communicating with various removable memories mounted on the computer 10.

The display 10*d* is a display device that displays any image. The input unit 10*e* is a device through which a user performs an input operation, and includes, for example, a keyboard and a mouse. In the embodiment, it is assumed that the computer 10 is a stationary terminal, but of course, the computer 10 may be a terminal of another aspect. For example, the computer 10 may be a tablet terminal or a smartphone terminal. When the computer 10 are these terminals, the input unit 10*e* may be implemented by a touch panel or the like. In any case, the user can input an intention of the user by operating the input unit 10*e* while visually recognizing an image or a character displayed on the display 10*d*.

When the computer 10 is activated, an OS (not shown) stored in the nonvolatile memory 10*c* is executed. Various functions such as communication and data storage in the computer 10 are executed using the OS. In the embodiment, executable functions using the OS include a printing function. That is, the OS according to the embodiment includes a general-purpose printer driver 10*a*1. In the computer 10, an application program (not shown) stored in the nonvolatile memory 10*c* can be executed while using the functions of the OS.

While various application programs are executed, the user can operate the input unit 10*e* to issue a print instruction for printing any content. At this time, the processor 10*a* controls the display 10*d* by a function of the general-purpose printer driver 10*a*1 to display a print setting input screen. The user operates the input unit 10*e* to input a print setting and issue the print instruction.

When the print instruction is issued, the processor 10*a* generates printing data 10*c*1 for performing printing according to the input setting using the function of the general-purpose printer driver 10*a*1. In the embodiment, the printing data 10*c*1 includes data indicating settings to be applied and content data indicating a content to be printed.

Figure 7:
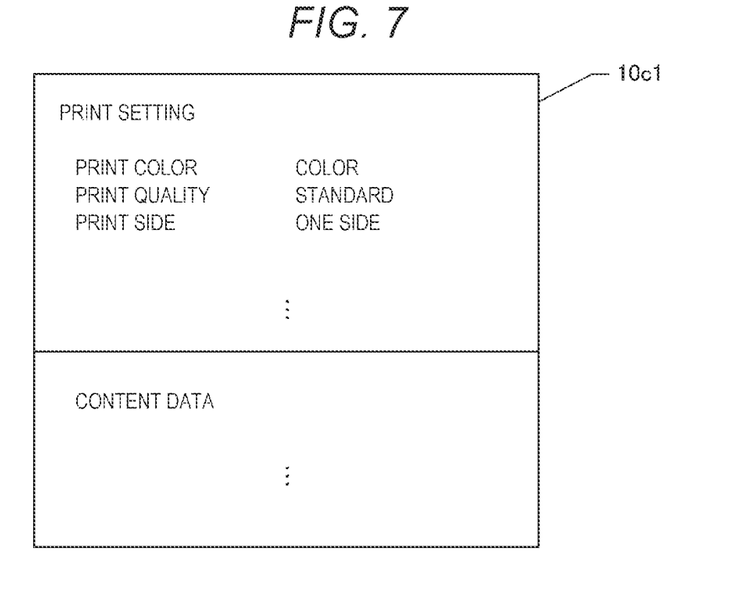
FIG. 7 is a diagram showing an aspect of printing data.

FIG. 7 is a diagram showing an example of such printing data 10*c*1. In the embodiment, the printing data 10*c*1 includes a portion in which the print settings are described and a portion in which the content data is described. In the portion in which the print settings are described, information indicating a setting content of each item is associated with an item indicating a type of the print setting. For example, an item for setting a print side is for setting whether to perform printing on one side or both sides of a print medium. The portion in which the content data is described includes image data indicating the content, character font data, and the like.

As described above, the computer 10 according to the embodiment can cause the printer 20 to execute printing by the function of the general-purpose printer driver 10*a*1. The printing caused by the general-purpose printer driver 10*a*1 is printing that does not use a printer driver specific to the printer 20. Therefore, when the computer 10 executes the function of the general-purpose printer driver 10*a*1, the computer 10 functions as a first computer.

Since the printing caused by the general-purpose printer driver is printing that does not use the printer driver specific to the printer 20, not all of the functions that can be executed by the printer 20 are always available. However, it is complicated to manually perform printing with a printer-specific printer driver. Moreover, when printing with a printer-specific printer driver is performed, a program related to a function that can be used by using a general-purpose printer driver is redundantly used for performing printing. Therefore, some users do not want to install a printer-specific printer driver.

Therefore, in the embodiment, a function that can be executed using a printer-specific printer driver can be automatically added to a function that can be executed using a general-purpose printer driver. As a result, the processor 10*a* executes an application program (not shown) and activates a print server 10*a*2 while the OS is executed. The print server 10*a*2 functions as a virtual printer using the Internet Printing Protocol (IPP). That is, when the print server 10*a*2 is activated, the general-purpose printer driver 10*a*1 recognizes the print server 10*a*2 as a virtual printer, and can execute printing with the print server 10*a*2 as a print destination.

When printing is executed by the print server 10*a*2, the processor 10*a* functions as a receiving unit 10*a*3, a download unit 10*a*4, an accepting unit 10*a*5, a generating unit 10*a*6, and a transmitting unit 10*a*7. With these functions, the computer 10 can generate printer data 10*c*3 from the printing data 10c1. When the computer 10 executes the function of the print server 10a2, the computer 10 functions as a second computer.

The receiving unit 10a3 has a function of receiving printing data. That is, when the general-purpose printer driver 10a1 issues a print instruction to the printer 20, the printing data 10c1 including settings of executable functions using the general-purpose printer driver 10a1 is generated. Further, in the embodiment, the printing data 10c1 is transmitted to the print server 10a2 as a transmission destination. That is, the user designates the printer 20 as a printer for executing printing, but in the embodiment, the printing data 10c1 is first transmitted from the general-purpose printer driver 10a1 to the print server 10a2. The processor 10a receives the printing data 10c1 by the function of the receiving unit 10a3.

These processes of transmission and reception are implemented using the IPP, but since these processes are internal processes of the computer 10, the printing data 10c1 is not transferred to the outside of the computer 10. Of course, if the first computer and the second computer are implemented by separate devices, the printing data 10c1 is transmitted from the first computer, and the second computer receives the printing data 10c1.

The download unit 10a4 has a function of specifying a custom setting that can be set in the printer 20 in addition to the print settings of the printing data 10c1, and downloads a processing module used for the specified custom setting. That is, the embodiment can execute the function that cannot be executed when the general-purpose printer driver 10a1 is used by downloading the processing module by the function of the download unit 10a4.

As a result, the processor 10a according to the embodiment specifies the processing module to be downloaded by the function of the download unit 10a4. That is, the processor 10a specifies a function other than the functions that can be implemented by the general-purpose printer driver 10a1, and downloads a processing module corresponding to the function. As a result, the processor 10a uses the function of the download unit 10a4 to output a transmission request of the device information 20c1 to the printer 20 that is the printer for executing printing. The processor 20a of the printer 20 replies the device information 20c1 stored in the nonvolatile memory 20c in response to the transmission request. The processor 10a receives the device information 20c1. As a result, the processor 10a acquires a printer name and a firmware version of the printer for executing printing.

Processing modules corresponding to settings applicable to a printer having the acquired printer name and using the acquired version of firmware are registered as the module information 30c1 in the server 30. The processor 10a then outputs a transmission request of the list of processing modules to the server 30 together with the information indicating the name and the version. As a result, the server 30 specifies the list of processing modules that can be applied in a state in which the version of firmware transmitted to the printer having the transmitted name is used, and replies the list to the computer 10.

The processor 10a refers to the list of processing modules, and specifies a processing module. The processing module is included in the list, is a function that cannot be executed by the general-purpose printer driver 10a1, and is not yet installed. In the embodiment, the processing module is created in advance for each executable function in the printer 20. For example, if a function of color adjustment and color matching can be executed in the printer 20, a processing module corresponding to this function is created in advance. If a finisher function can be executed in the printer 20, a processing module corresponding to this function is created in advance as a module that can be installed separately from the processing module of the color adjustment and color matching.

Therefore, a process of specifying a processing module that is included in the list of processing modules, that is a function that cannot be executed by the general-purpose printer driver 10a1, and that is not yet installed corresponds to a process of specifying an item that cannot be set in the general-purpose printer driver 10a1. A setting in the item is referred to as the custom setting. The above process can be said to be a process of specifying a custom setting that can be set in the printer 20 in addition to the print settings of the printing data 10c1.

The above process will be described more specifically. By the function of the download unit 10a4, the processor 10a analyzes the print settings of the printing data 10c1 to specify the custom setting. As a result, the processor 10a refers to the portion in which the print settings are described in the printing data 10c1 by the function of the download unit 10a4. The item in which the setting content of the print setting is described in this portion is an item of the print setting that can be set by the function of the general-purpose printer driver 10a1. On the other hand, an item of the print setting that is not included in this portion is estimated to be an item that cannot be set by the function of the general-purpose printer driver 10a1.

The list of processing modules acquired from the server 30 indicates processing modules corresponding to respective settings applicable to the printer 20. Therefore, the processor 10a specifies, as the custom setting, a setting that is not included in the print settings of the printing data 10c1 and can be set by the processing module acquired from the server 30.

Figure 8:
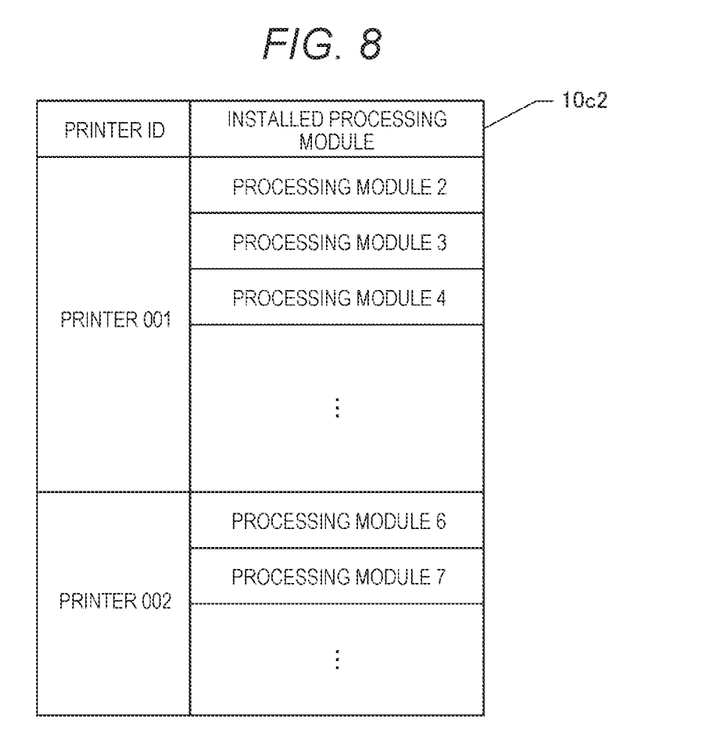
FIG. 8 is a diagram showing an example of processing module data.

The installation of the processing module is executed at various timings, and the processing module to be installed may be changed depending on the firmware version of the printer 20. Therefore, the installed processing module may be changed. The processor 10a then serves a processing module that is not yet installed in the computer 10 as the processing module to be installed, and specifies the custom setting corresponding to the processing module to be installed. More specifically, the installed processing module is recorded in the nonvolatile memory 20c as processing module data 10c2. FIG. 8 is a diagram showing an example of the processing module data 10c2. The processing modules installed in the computer 10 are recorded in association with printer names as shown in FIG. 8.

The processor 10a refers to the processing module data 10c2, and specifies the installed processing module in the computer 10 related to a printer designated as the printer for executing printing during the print instruction of the printing data 10c1. The processor 10a specifies the processing module that is not installed as the processing module of the printer for executing printing from the processing modules for executing the custom setting.

When the processing module that is not installed is specified as described above, the processor 10a outputs, to the server 30, a download request of a processing module together with information indicating the processing module. In response to the download request, the server 30 transmits a program of the requested processing module to the computer 10. When the processing module is acquired, the processor 10a installs the processing module. When the processing module is installed, the processor 10*a* can cause the printer 20 to execute a function corresponding to the processing module.

When the processing module is installed, the computer 10 can generate a custom setting screen and printer data. The accepting unit 10*a*5 has a function of accepting a setting content of a custom setting from a user via the custom setting screen. That is, the processor 10*a* controls the display 10*d* by the function of the accepting unit 10*a*5 to display the custom setting screen for accepting a custom setting to be applied to printing using the installed processing module. The user can use the custom setting screen to input a setting content for an item that cannot be set in the general-purpose printer driver 10*a*1.

For example, when a setting of the color adjustment and color matching is the item of the custom setting, the accepting unit 10*a*5 accepts parameters for the color adjustment and color matching, for example, a degree of the color adjustment and a profile to be referred to in the color matching. When a setting of the finisher function is the item of custom setting, the accepting unit 10*a*5 accepts designation of the finisher function to be operated, for example, designation of use of staples and execution of punching.

The generating unit 10*a*6 has a function that generates the printer data 10*c*3 using a processing module in accordance with the accepted setting content and the printing data 10*c*1. More specifically, the processor 10*a* executes the processing module by the function of the generating unit 10*a*6, and processes the printing data 10*c*1, so that printing applied with the custom setting set on the custom setting screen is performed. The process is at least one of updating information included in the printing data 10*c*1 and adding information to the printing data 10*c*1.

More specifically, when the custom setting is applied by a processing module related to generation of the content data, the processor 10*a* processes the printing data 10*c*1 based on the content data contained in the printing data 10*c*1, and updates the original content data with the processed data. For example, when the custom setting is a setting related to the color adjustment and color matching, the processor 10*a* performs the color adjustment and color matching according to the setting content on the content data contained in the printing data 10*c*1 by the function of the processing module.

When the custom setting is applied by transmitting parameters indicating the setting content to the printer 20, the processor 10*a* adds information associating the setting content with the item of the custom setting to the portion in which the print setting is described in the printing data 10*c*1. For example, if the custom setting is the setting related to the finisher function, the processor 10*a* adds a parameter value indicating a setting content to be applied in association with an item name of the finisher function to the portion in which the print setting is described in the printing data 10*c*1.

In this manner, data subjected to at least one of updating information included in the printing data 10*c*1 and adding information to the printing data 10*c*1 is the printer data 10*c*3. The transmitting unit 10*a*7 has a function of transmitting the printer data 10*c*3 to the printer. That is, when the printer data 10*c*3 is generated, the processor 10*a* transmits the printer data 10*c*3 to the printer 20, which is the printer for executing printing, via the communication unit 10*b* by the function of the transmitting unit 10*a*7. As a result, the printer 20 executes printing based on the printer data 10*c*3.

The printer data 10*c*3 includes data for executing a setting of a function that cannot be executed even using the general-purpose printer driver 10*a*1. Therefore, even when the print instruction is issued using the general-purpose printer driver 10*a*1, printing applied with a function that cannot be executed by the general-purpose printer driver 10*a*1 can be performed.

Further, according to the above embodiment, a processing module for a function that cannot be executed by the general-purpose printer driver 10*a*1 is installed, and a processing module for a function that can be executed by the general-purpose printer driver 10*a*1 is not installed. Therefore, in order to execute all the functions specific to the printer 20, it is not necessary to store all the programs corresponding to specific functions in the computer 10. Therefore, it is possible to meet needs of a user who does not want to store all the programs corresponding to the specific functions in the computer 10. Further, according to the embodiment, the processing module to be installed is automatically selected by the function of the download unit 10*a*4. Therefore, it is possible to meet needs of a user who does not want to perform work of storing all the programs corresponding to the specific functions in the computer 10.

(2) Printing Control Process

Figure 9:
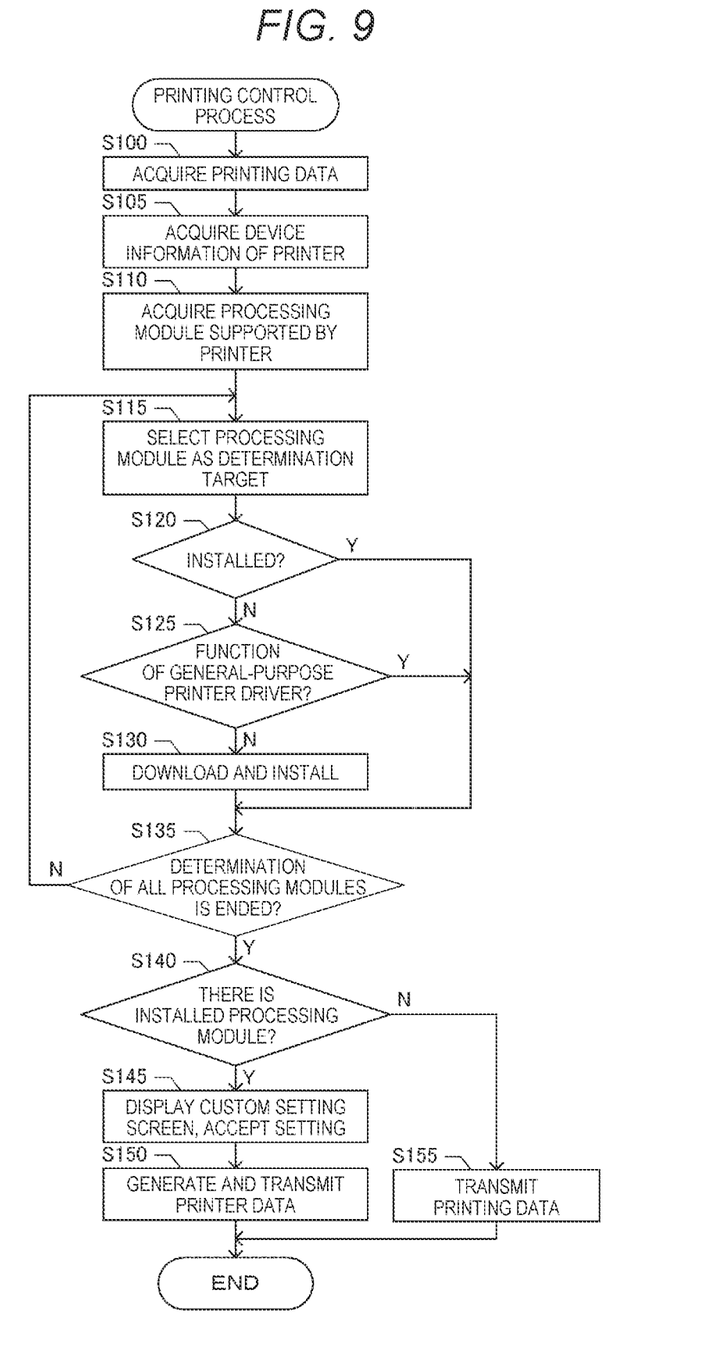
FIG. 9 is a diagram showing a flowchart of a printing control process.

FIG. 9 is a flowchart of the printing control process. When the user performs printing related to any contents, the user operates the input unit 10*e* of the computer 10 to perform an input for starting a printing process. The input may be performed by various methods, and for example, an instruction to start the printing process while an application program is executed corresponds to the input. When the instruction to start the printing process is issued, the computer 10 activates the general-purpose printer driver 10*a*1 by the function of the OS, and accepts the print settings.

That is, the processor 10*a* controls the display 10*d* to display a settings screen for general print settings. The user operates the input unit 10*e* to input a desired print setting, designates the printer for executing printing (printer 20 in the example shown in FIG. 1), and issues a printing execution instruction. When the printing execution instruction is issued, the computer 10 generates the printing data 10*c*1 for causing the printer 20 to execute printing with the print settings input by the user by the function of the general-purpose printer driver 10*a*1. When the printing data 10*c*1 is generated, the processor 10*a* transmits the printing data 10*c*1 to the print server 10*a*2.

When the printing data 10*c*1 is transmitted, the processor 10*a* acquires the printing data by the function of the receiving unit 10*a*3 (step S100). Next, the processor 10*a* acquires the device information of the printer by the function of the download unit 10*a*4 (step S105). More specifically, the processor 10*a* outputs a transmission request of the device information 20*c*1 to the printer 20 that is the printer for executing printing, and receives the device information 20*c*1 transmitted from the printer 20. As a result, a name of the printer 20, which is the printer for executing printing, and a firmware version to be applied are specified.

Next, the processor 10*a* acquires a processing module supported by the printer by the function of the download unit 10*a*4 (step S110). More specifically, the processor 10*a* outputs, to the server 30, a transmission request of a list of processing modules together with the device information 20*c*1 acquired in step S105. As a result, the server 30 replies a list of processing modules supported by the printer 20 that is the printer for executing printing. The computer 10 acquires the list. Since the processing module corresponds to a function that can be executed by the printer 20, custom settings that can be set in the printer 20 are specified from the list of processing modules.

Next, the processor 10*a* specifies the processing module to be downloaded by the function of the download unit 10*a*4 and a loop of steps S115 to S135. In this loop, first, the processor 10*a* selects a processing module as a determination target (step S115). That is, one processing module which is not a determination target in steps S115 to S135 is selected from the list of processing modules acquired in step S110, and is set as the determination target.

Next, the processor 10*a* determines whether the processing module as the determination target is installed by the function of the download unit 10*a*4 (step S120). That is, the processor 10*a* refers to the processing module data 10*c*2, and determines whether the processing module selected as the determination target in step S115 is included in the processing module data 10*c*2. When the processing module is included in the processing module data 10*c*2, it is determined that the processing module selected as the determination target in step S115 is already installed in the computer 10.

When it is determined in step S120 that the processing module as the determination target is installed, the processor 10*a* skips steps S125 and S130. On the other hand, when it is determined in step S120 that the processing module as the determination target is not installed, the processor 10*a* determines whether a function corresponding to the processing module as the determination target is the function of the general-purpose printer driver 10*a*1 by the function of the download unit 10*a*4 (step S125).

More specifically, the processor 10*a* specifies the function corresponding to the processing module selected as the determination target in step S115. The processor 10*a* also determines whether an item indicating the corresponding function is included in the portion in which the print setting is described in the printing data 10*c*1. When the item indicating the corresponding function is included in the portion in which the print setting is described in the printing data 10*c*1, the processor 10*a* determines that the corresponding function is the function of the general-purpose printer driver 10*a*1. When it is determined in step S125 that the function corresponding to the processing module as the determination target is the function of the general-purpose printer driver 10*a*1, the processor 10*a* skips step S130.

When it is determined in step S125 that the function corresponding to the processing module as the determination target is not the function of the general-purpose printer driver 10*a*1, the processor 10*a* downloads and installs the processing module as the determination target by the function of the download unit 10*a*4 (step S130). Next, the processor 10*a* determines whether the determination of all processing modules is ended by the function of the download unit 10*a*4 (step S135). That is, the processor 10*a* determines whether all the list of the processing modules acquired in step S110 are subject to the determination of the determination target in the loop of steps S115 to S135. When not all the list of the processing modules acquired in step S110 are selected as the determination target of the loop of steps S115 to S135, the processor 10*a* repeats the subsequent processes from step S115.

When all the list of the processing modules acquired in step S110 are selected as the determination target of the loop of steps S115 to S135, the processor 10*a* determines that the installation is completed, and executes a process of step S140 and thereafter.

In step S140, the processor 10*a* determines whether there is an installed processing module by the function of the accepting unit 10*a*5. More specifically, the processor 10*a* refers to the processing module data 10*c*2, and specifies the installed processing module associated with the printer 20 that is the printer for executing printing.

When it is determined in step S140 that there is an installed processing module, the processor 10*a* displays a custom setting screen and accepts settings using the function of the accepting unit 10*a*5 (step S145). That is, the processor 10*a* executes the processing module data associated with the printer 20, and controls the display 10*d* to display the custom setting screen. The processor 10*a* accepts custom settings input by the user operating the input unit 10*e*.

When the user operates the input unit 10*e* on the custom setting screen to input a print instruction, the processor 10*a* generates the printer data 10*c*3 and transmits the printer data 10*c*3 to the printer 20 (step S150). That is, the processor 10*a* executes the processing module data associated with the printer 20 by the function of the generating unit 10*a*6, and generates the printer data 10*c*3 for performing printing applied with the custom settings in addition to the print settings indicated by the printing data 10*c*1. The processor 10*a* transmits the printer data 10*c*3 to the printer 20 by the function of the transmitting unit 10*a*7. As a result, the printer 20 prints the content by applying the custom settings in addition to the print settings indicated by the printing data 10*c*1.

On the other hand, when it is determined in step S140 that there is no installed processing module, the processor 10*a* transmits the printing data 10*c*1 to the printer 20 by the function of the transmitting unit 10*a*7 (step S155). As a result, the printer 20 prints the content by applying the print settings indicated by the printing data 10*c*1.

(3) Other Embodiments

The above embodiment is an example for implementing the present disclosure, and various other embodiments can be adopted. For example, the device configuration of the printing system is not limited to the configuration shown in FIG. 1, and the printer 20 may be a multifunction peripheral having a scanning function and the like. The computer 10 may be capable of printing on a printer other than the printer 20, and there may be a plurality of computers 10. Further, the terminals shown in FIG. 1 may be a smaller number of terminals that share functions, or may be a larger number of terminals. For example, the computer 10 and the server 30 may be an integrated device, at least a part of the functions of the computer 10 may be executed by the printer 20 or the server 30, and at least a part of the functions of the printer 20 may be executed by the computer 10 or the server 30. Further, at least a part of the functions of the server 30 may be executed by the computer 10 or the printer 20. Further, the terminals may be configured with a larger number of terminals such as the server 30 being a cloud server.

Figure 10:
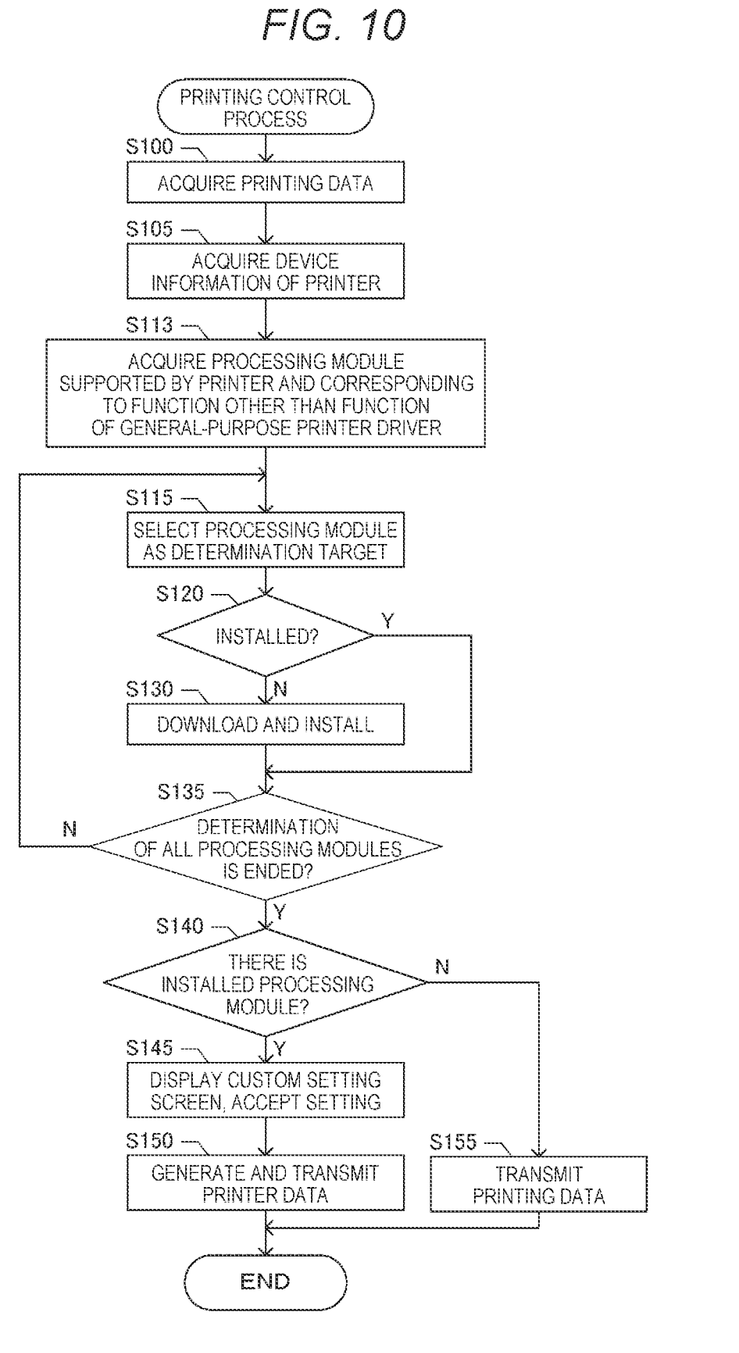
FIG. 10 is a diagram showing a flowchart of a printing control process according to a second embodiment.

FIG. 10 is a flowchart of a process in which a part of the process related to the determination of the download unit is executed by the server 30. The configuration shown in FIG. 10 can be implemented by the same configuration as the computer 10, the printer 20, and the server 30 described above. In the flowchart shown in FIG. 10, the same reference numerals as those in FIG. 9 are given to portions that perform the same processes as those in FIG. 9. That is, in the flowchart shown in FIG. 10, S113 is executed instead of S110 shown in FIG. 9, and S125 shown in FIG. 9 is not executed, and other processes are the same as in FIG. 9. In step S113, the processor 10*a* acquires a processing module supported by the printer and corresponding to a function other than the function of the general-purpose printer driver by the function of the download unit 10a4.

More specifically, the processor 10a refers to the portion in which the print settings are described in the printing data 10c1 and acquires the item set as the print setting by the function of the download unit 10a4. The item of the print setting is estimated to be the item that cannot be set by the function of the general-purpose printer driver 10a1.

In the example shown in FIG. 10, the server 30 is caused to determine the processing module to be installed. The processor 10a then transmits, to the server 30, the device information of the printer 20 acquired in step S105 and the items set as the print settings in the printing data 10c1. The server 30 refers to the module information 30c1 and specifies the processing modules supported by the printer 20 based on the device information. Then, the server 30 excludes the processing module corresponding to the item set as the print setting in the printing data 10c1 from the specified processing modules, and serves the processing module as the processing module to be installed.

When the processing module to be installed is specified, the server 30 transmits information indicating the corresponding processing module to the computer 10. The processor 10a acquires the corresponding processing module and serves the processing module as the processing module supported by the printer and corresponding to a function other than the function of the general-purpose printer driver. Then, in the loop of steps S115 to S135, the computer 10 determines whether the processing module to be installed is already installed, and if not, downloads and installs the processing module to be installed.

Even in the above process, the computer 10 specifies the processing module to be downloaded based on the information transmitted from the server 30. Accordingly, it can be said that the computer 10 substantially specifies the custom setting that can be set in the printer 20 in addition to the print settings of the printing data 10c1.

The first computer may generate the printing data without using the printer-specific printer driver. Here, the printer-specific printer driver is a printer driver installed in the first computer for printing by the printer as described above, and is a printer driver that can vary depending on the model of the printer and the like. Accordingly, the printer-specific printer driver can use all or almost all of the functions of the printer. Note that if the printer-specific printer driver or the firmware version of the printer is different, usable functions may differ, but most of the functions are the same, and thus, there may be some differences in function depending on the version, but almost all functions can be used even if the versions are different.

In order to generate the printing data without using the printer-specific printer driver, a general-purpose printer driver included in the OS as described above may be used, a printer driver having a common printer manufacturer may be used, or a general-purpose printer driver included in an external device, for example, a server connected via the Internet, may be used. The printing data may be data for printing content created by an application program by a printer, and the printing data generated by the first computer may be printing data for performing printing not only by the IPP but also by various protocols.

The second computer may generate the printer data from the printing data. The printing data is data that can be printed by a printer, but is generated without using a printer-specific printer driver, and therefore, the functions of the printer may be all unusable. On the other hand, the printer data is data that can be printed using a function unusable when the printer-specific printer driver is used. In the above-described example, the second computer is the same device as the first computer, but both may be separate devices.

The printer is a device that performs printing based on the printer data, and may of course be capable of performing printing based on printing data. There may be a plurality of printers, or there may be a plurality of printers of a plurality of models.

The download unit may specify the custom setting that can be set in the printer in addition to the print setting of the printing data, and download the processing module used for the specified custom setting. The custom setting may be specified based on a determination made by the second computer, or may be specified by the second computer acquiring a determination result made by an external device such as a server. A first embodiment shown in FIG. 9 is the former, and a second embodiment shown in FIG. 10 is the latter.

The custom setting is a setting that can be set in the printer in addition to the print setting of the printing data. Therefore, the setting that cannot be executed in the printing data generated without using a printer-specific printer driver is the custom setting.

The accepting unit may accept the setting content of the custom setting from the user via the custom setting screen. The custom setting screen may be implemented in various forms. For example, after the processing module is downloaded and applied, the custom setting screen may be added to the print setting screen of the general-purpose printer driver. When a plurality of printers are used, the custom setting screen may be different for each printer, and therefore the custom setting screen may be switched according to the selection of the printer. The custom setting screen may be displayed anywhere, may be displayed on the display of the first computer, may be displayed on the display of the second computer, or may be displayed on another device such as a smartphone owned by the user.

The generating unit may generate the printer data using a processing module in accordance with the accepted setting content and the printing data. That is, the generating unit may generate data for applying the custom setting as the printer data in addition to the setting indicated by the printing data.

The present disclosure is also applicable to a program executed by a computer and a method. The system, the program, and the method as described above may be implemented as a single apparatus, and may be implemented by using components provided in a plurality of apparatuses. Each element may be provided in an apparatus different from the above-described apparatus, and various aspects may be included. Changes can be made as appropriate, such as a part thereof being software and a part thereof being hardware. The present disclosure may be implemented by a recording medium of a program for controlling a system. Of course, the recording medium of the program may be a magnetic recording medium or a semiconductor memory, and the same is true for any recording medium to be developed in the future.

What is claimed is:

1. A printing system comprising:
a first computer configured to generate printing data without using a printer-specific printer driver;
a second computer configured to generate printer data from the printing data; and
a printer configured to perform printing based on the printer data, wherein the second computer includes
- a receiving unit configured to receive the printing data,
- a download unit configured to specify a custom setting configured to be capable of setting in the printer in addition to a print setting of the printing data, and download a processing module used for the specified custom setting,
- an accepting unit configured to accept a setting content of the custom setting from a user via a custom setting screen,
- a generating unit configured to generate the printer data using the processing module in accordance with the accepted setting content and the printing data, and
- a transmitting unit configured to transmit the printer data to the printer.

2. The printing system according to claim 1, wherein the download unit specifies the custom setting by analyzing the print setting of the printing data.

3. The printing system according to claim 2, wherein the download unit specifies, as the custom setting, a setting that is not included in the print setting of the printing data and is included in a setting applicable to the printer.

4. The printing system according to claim 1, wherein the accepting unit generates the custom setting screen using the downloaded processing module.

5. The printing system according to claim 1, wherein the accepting unit causes the first computer to display the custom setting screen.

6. The printing system according to claim 1, wherein the first computer generates the printing data by using a general-purpose printer driver corresponding to different models of printers.

7. A printing control device comprising:
- an acquisition unit configured to acquire printing data including a printer as a print destination, a print setting, and a print image;
- a specifying unit configured to specify a custom setting configured to be capable of setting in the printer in addition to the print setting;
- a download unit configured to download a processing module used for the specified custom setting;
- an accepting unit configured to accept a setting content of the custom setting from a user;
- a generating unit configured to generate printer data using the processing module in accordance with the accepted setting content and the printing data; and
- a transmitting unit configured to transmit the printer data to the printer.

8. A printing control program for causing a computer to operate as:
- an acquisition unit configured to acquire printing data including a printer as a print destination, a print setting, and a print image;
- a specifying unit configured to specify a custom setting configured to be capable of setting in the printer in addition to the print setting;
- a download unit configured to download a processing module used for the specified custom setting;
- an accepting unit configured to accept a setting content of the custom setting from a user;
- a generating unit configured to generate printer data using the processing module in accordance with the accepted setting content and the printing data; and
- a transmitting unit configured to transmit the printer data to the printer.

* * * * *